Jan. 24, 1928.
L. S. GUNDERMAN
1,657,356
PEDAL CONTROL ATTACHMENT FOR AUTOMOBILES
Filed Oct. 26, 1926
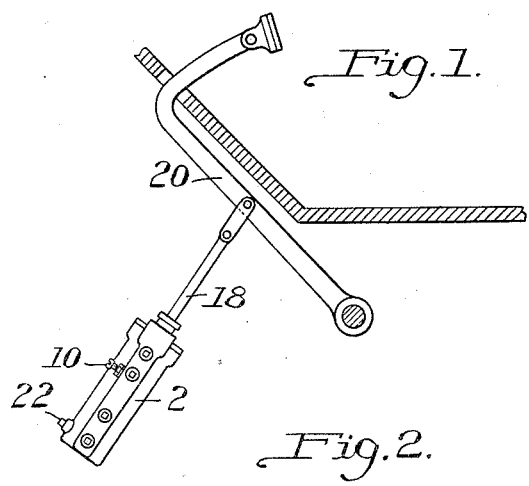
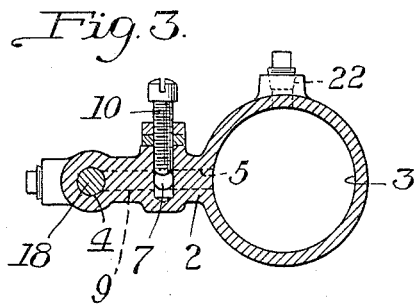
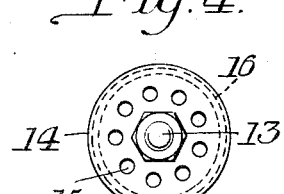
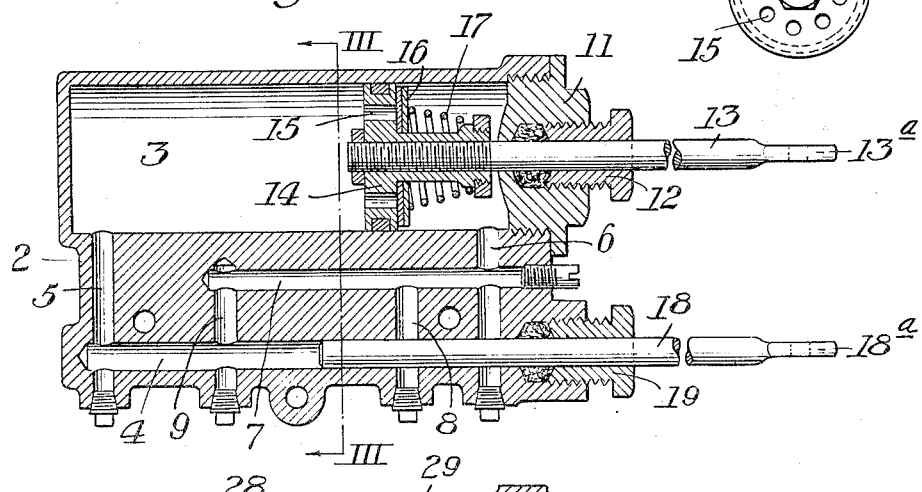
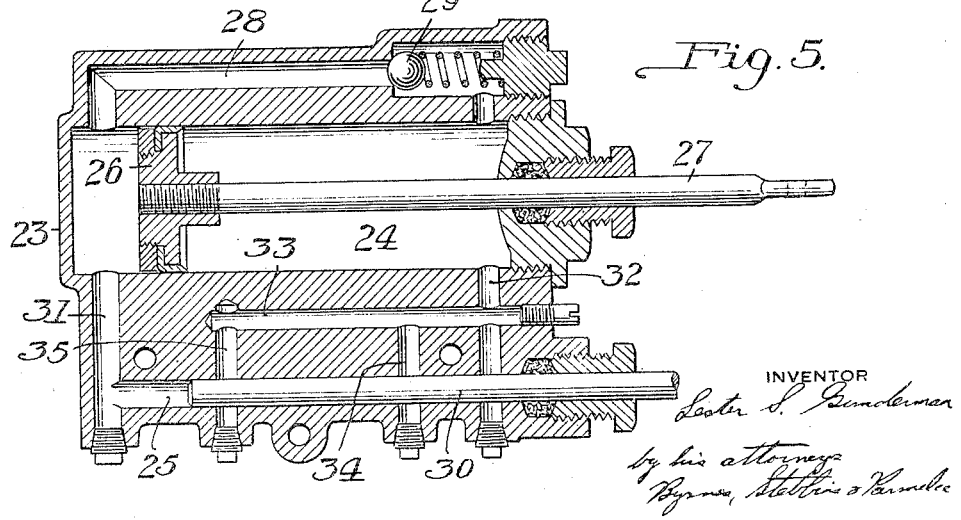

Patented Jan. 24, 1928.

1,657,356

UNITED STATES PATENT OFFICE.

LESTER S. GUNDERMAN, OF PITTSBURGH, PENNSYLVANIA.

PEDAL-CONTROL ATTACHMENT FOR AUTOMOBILES.

Application filed October 26, 1926. Serial No. 144,271.

This invention is for an attachment for automobiles and comprises more particularly a device adapted to be connected with the clutch and brake pedals of an automobile for controlling the movement of one pedal, to a certain extent, from the movement of the other pedal.

In an automobile the clutch and brake pedals are ordinarily arranged one beside the other. In their use, the brake is often operated without operating the clutch, and the clutch is often operated without movement of the brake pedal. In coming to a stop, both pedals are usually depressed simultaneously. If the car is stopped on an uphill grade, it starts to roll back as soon as the brake is released, or the emergency brake is used, or the engine is speeded up by the hand control while the foot, needed for the accelerator pedal, is kept on the brake.

According to the present invention, it is proposed to provide a device which will not interfere with the separate operation of the pedals, so that it affords no impediment to driving, but which, when both pedals are simultaneously depressed, will function in such a way that the brake is gradually released as the clutch is being gradually brought into operative position, whereby the operator is free to use his foot on the accelerator and the car can be smoothly started without jerking.

The invention may be readily understood by reference to the accompanying drawings which illustrate one embodiment of my invention, and in which, Figure 1 is a side view showing diagrammatically the attachment together with its relation to the brake and clutch pedals.

Figure 2 is a longitudinal section through the attachment.

Figure 3 is a transverse section in the plane of line III—III of Figure 1.

Figure 4 is an end view of the clutch control plunger.

Figure 5 is a view similar to Figure 2 of slightly modified form.

The attachment preferably comprises an integral body 2, having a cylinder 3, and a valve chamber 4 formed therein. One end of the cylinder connects with one end of the valve chamber through a passage 5. The other end of the cylinder connects with the valve chamber 4 through a passage 6, leading into a second passage 7, which has two branches, 8 and 9, both of which lead to the valve chamber. The passages 8 and 9 open into the valve chamber at spaced apart points in the chamber. The branch passage 9 is preferably restricted with respect to the passage 8. For restricting the passage 9 and adjusting the degree of restriction, there is preferably provided a simple adjustment in the form of a screw 10. By setting the screw 10 in, the branch passage 9 may be further restricted, and by turning the screw out, the degree of restriction may be lessened.

One end of the cylinder 3 is closed while the other end is provided with a plug 11, having a central packing gland 12 thereon. Passing through the gland 12 is a rod 13 having a piston 14 at its inner end. The piston 14 is valved so as to permit fluid in the cylinder to pass through the piston when the piston moves in the direction of the arrow shown in Figure 2, but which prevents passage of fluid through the piston in the opposite direction. Any suitable check valve may be employed in the piston for this purpose. I have shown a series of holes 15, in the piston with a valve disc 16 against one face of the piston, this disc being held against the face of the piston by a spring 17.

Slidably fitted in the chamber 4 is a valve rod 18. This rod is adapted in one position to cover both the passages 8 and 9, and in another position to uncover only the restricted passage 9, and in a third position to uncover both the passages 8 and 9. The valve rod 18 operates through a gland 19.

The rod 13 has a terminal 13ª for connection with the brake pedal or an extension thereof, and the rod 18 has a similar terminal 18ª for connection with the clutch pedal. The clutch pedal, which is diagrammatically illustrated, is designated 20.

In operation, the device is filled with oil or other fluid through the filling plug 22. It will be seen that the clutch pedal, upon being depressed, will force the rod 18 in. This movement of the rod 18 is unobstructed, so that the clutch can be operated freely at all times. If the clutch pedal is in released position, at which time the rod 18 is in its outermost position so that the passages 8 and 9 are uncovered, the brake can be operated freely. When the brake pedal is depressed, the fluid in the cylinder can either pass through the check valve or pass through the connecting passages between the valve chamber. When the brake pedal moves out, the piston travels in the opposite direction and the fluid can circulate through the passage 6, the passage 7 and the branch passages 8 and 9.

If, however, the clutch and brake pedals are depressed simultaneously, the rod 18 will shut off communication between the outer end of the cylinder and the valve chamber. This means that no fluid can flow out of the passage 6 into the valve chamber 4 and back through the passage 5 into cylinder 3. Consequently, the brake pedal cannot return to its normal position. As long as the clutch pedal is depressed, the brake pedal must remain depressed. The operator at such time can take his foot off the brake pedal if he desires to do so. As the clutch pedal moves to releasing position, the passage 9 is first opened, allowing for a gradual flow of fluid through the passage 6, the passage 9, the valve chamber 4, the passage 5 back into the cylinder. This allows the brake pedal to move slowly back to normal position. If the clutch is fully released so that the passage 8 is also uncovered, the fluid may circulate more freely and the brake will be released more rapidly, but not with sufficient rapidity to allow the car to be jerked.

In the modification shown in Figure 5, the construction and arrangement is substantially the same as that shown in Figure 2, with the exception that instead of providing a valved bypass through the piston itself, this valved bypass is provided in the walls of the structure. In this view 23 represents the body of the attachment having a cylinder 24 and a valve chamber 25. Reciprocable in the cylinder 24 is the plunger 26 having a piston rod 27 attached thereto. Communicating with the opposite ends of the cylinder 24 is a passage 28 having a check valve 29 therein. The passages through the valve chamber are the same as hereinbefore described, 31 being a passage from one end of the cylinder to the valve chamber, and 32 being a passage from the other end of the cylinder into a passage 33 having branches 34 and 35 communicating with the chamber 35.

The advantages of the invention arise from the provision of means for a gradual letting of the brake into operative position when the car is standing still, so that starting on a hill, especially is facilitated. A further advantage of the invention resides in the provision of an attachment which will permit of such operation of the brake without interfering with the independent operation of either pedal and without requiring the use of any mechanical locking or holding devices. The device can be cheaply built and can be easily installed on automobiles. The attachment can be located at a suitable point in the body, according to the type of the car.

It will be understood that the particular embodiment of the invention shown in the drawings and herein particularly described, is merely illustrative of the invention, and that the invention may be otherwise embodied and may be otherwise connected to the clutch and brake within the contemplation of my invention and under the scope of the following claims:

I claim:

1. The combination with brake and clutch mechanisms of an automobile, of a fluid pressure control unit therefor, said unit having a cylinder and a brake controlling piston operative in the cylinder, said piston being operatively connected with the brake mechanism, and a valve communicating with the cylinder for governing the movement of the piston operatively connected with the clutch mechanism.

2. The combination with brake and clutch pedals of an automobile, of a fluid pressure control unit therefor including a fluid pressure cylinder having a piston operatively connected with the brake pedals, and means connected with the clutch pedal for selectively controlling the operation of the said piston.

3. The combination with brake and clutch pedals of an automobile, of a cylinder having a valved piston therein, said piston being operatively connected with one of the pedals, a bypass between opposite ends of the cylinder, and a valve for controlling fluid flow through the bypass, said valve being operatively connected with the other pedal.

4. The combination with the clutch and brake pedals of an automobile, of a fluid pressure cylinder having its piston operatively connected to the brake pedal, and a control means for the cylinder operatively connected with the clutch pedal.

5. The combination with the clutch and brake pedals of an automobile, of a valve operatively connected with the clutch, a fluid circulating system controlled by the valve, and means responsive to the flow of the fluid through the valve for controlling the operation of the brake pedal.

6. The combination with the brake and clutch pedals of an automobile, of a control attachment therefor including a cylinder, a valved piston in the cylinder operatively connected with the brake pedal, a valve chamber communicating with opposite ends of the cylinder through passageways, means in one of the passageways for adjustably restricting the same, and a valve in the chamber operatively connected with the clutch pedal.

7. The combination with the brake and clutch pedals of an automobile, of a control attachment therefor including a cylinder, a valved piston in the cylinder operatively connected with the brake pedal, a valve chamber connected with one end of the cylinder through a passageway and connected with the other end of the cylinder through two passageways, means for adjustably restricting one of the last mentioned passageways, and a valve in the chamber operatively connected with the clutch pedal for selectively controlling the circulation of fluid through the passageways.

8. A control attachment for vehicle pedals including a cylinder, a valved piston in the cylinder, having an extension thereon for connection with a brake pedal, a valve body, passages connecting the opposite ends of the cylinder with the valve body, a movable valve member in the valve body having an operating extension thereon for attachment to a clutch pedal.

9. The combination with clutch and brake pedals of an automobile, of a control attachment having a cylinder and a valve chamber in communication with opposite ends of the cylinder, a plunger in the cylinder operatively connected with the brake pedal, a valve in the valve chamber connected with the clutch pedal, and a bypass between opposite sides of the plunger having a check valve therein, said check valve being adapted to pass fluid on the inward stroke only of the plunger.

In testimony whereof I have hereunto set my hand.

LESTER S. GUNDERMAN.